United States Patent
Kashiwase (10) Patent No.: US 8,249,514 B2
(45) Date of Patent: Aug. 21, 2012

(54) RADIO COMMUNICATION METHOD, DEVICE AND SYSTEM FOR EQUALIZING A SIGNAL

(75) Inventor: Susumu Kashiwase, Yokohama (JP)

(73) Assignee: Kyocera Corporation, Kyoto (JP)

( * ) Notice: Subject to any disclaimer, the term of this patent is extended or adjusted under 35 U.S.C. 154(b) by 232 days.

(21) Appl. No.: 12/298,340

(22) PCT Filed: Apr. 26, 2007

(86) PCT No.: PCT/JP2007/059077
§ 371 (c)(1),
(2), (4) Date: Jun. 1, 2010

(87) PCT Pub. No.: WO2007/126008
PCT Pub. Date: Nov. 8, 2007

(65) Prior Publication Data
US 2010/0233966 A1    Sep. 16, 2010

(30) Foreign Application Priority Data
Apr. 27, 2006  (JP) ................. P2006-124507

(51) Int. Cl.
*H04B 17/00* (2006.01)

(52) U.S. Cl. .................. 455/67.11; 455/562.1; 455/420; 455/456.2; 455/456.5; 455/456.6; 370/310; 375/229

(58) Field of Classification Search .............. 455/67.11, 455/561, 562.1, 420, 424, 426.1, 456.2, 456.5, 455/456.6; 370/310, 449; 375/267, 229
See application file for complete search history.

(56) References Cited

U.S. PATENT DOCUMENTS

| | | | |
|---|---|---|---|
| 6,609,011 B1 * | 8/2003 | Saito et al. | 455/561 |
| 6,895,253 B1 * | 5/2005 | Carloni et al. | 455/506 |
| 7,043,275 B2 * | 5/2006 | Matsuoka et al. | 455/562.1 |
| 7,054,292 B2 * | 5/2006 | Hall et al. | 370/334 |
| 2005/0250564 A1 * | 11/2005 | Kishigami et al. | 455/575.7 |

FOREIGN PATENT DOCUMENTS

| | | |
|---|---|---|
| JP | 2001-102970 A | 4/2001 |
| JP | 2002-141888 A | 5/2002 |
| JP | 3375139 B2 | 11/2002 |
| WO | 98/56121 | 12/1998 |

* cited by examiner

Primary Examiner — Shaima Q Aminzay
(74) Attorney, Agent, or Firm — DLA Piper LLP (US)

(57) ABSTRACT

A base station 20 monitors change of a parameter for an adaptive array antenna, the parameter being used to control a directivity of a beam to be transmitted to a mobile terminal device 30. As a result, when detecting that a value indicating the change has fallen below a predetermined value, the base station 20 suppresses control of the directivity of a transmission signal. Moreover, the base station 20 transmits decrease information to the mobile terminal device 30, the decrease information indicating that the value indicating the change has fallen below the predetermined value. Upon receipt of the decrease information transmitted from the base station 20, the mobile terminal device 30 equalizes a signal to be transmitted to the base station 20 on the basis of a delay status of a reception signal received from the base station 20, and then transmits the equalized signal to the base station 20.

6 Claims, 9 Drawing Sheets

RADIO COMMUNICATION METHOD, DEVICE AND SYSTEM FOR EQUALIZING A SIGNAL

CROSS-REFERENCE TO RELATED APPLICATIONS

This application is a national stage of international application No. PCT/JP2007/059077 filed on Apr. 26, 2007, which also claims the benefit of priority under 35 USC 119 to Japanese Patent Application No. 2006-124507 filed Apr. 27, 2006, the entire contents of which are incorporated herein by reference.

TECHNICAL FIELD

The present invention relates to a radio communication method, a radio communication device, and a radio communication system, which employ TDD (Time Division Duplex).

BACKGROUND ART

A TDD-TDMA scheme has been known as an air interface employed in a radio communication system which forms a service area divided into multiple cells (sectors) and includes multiple base station devices. In the radio communication system employing the TDD-TDMA scheme (for example, Personal Handyphone System), an influence of fading in a communication path hinders increase of the communication capacity.

Multipath fading, in particular, is caused by the presence of several delay waves. In the communication path having multi-paths, characteristics of a propagation path can be improved by equalizing the delay waves. In the communication system employing TDD, the same frequency is used for downlink and uplink communication paths. For this reason, for example, when a mobile station (terminal) equalizes the delay waves on the uplink communication channel, a delay spread estimated based on a signal received on the downlink communication channel can be applied to a delay spread for the uplink communication channel without any changes.

Patent Document 1 discloses an asymmetric radio communication method in which the communication speed of the downlink is higher than that of the uplink. Specifically, the asymmetric radio communication method employs orthogonal frequency-division multiplexing (OFDM) for the downlink. An IDFT input signal used in such an OFDM-compliant modulator is provided with such characteristics that are the uplink characteristics of frequency characteristics of the propagation path which are estimated from a signal on the uplink (uplink communication channel).

In addition, Patent Document 1 also discloses the following application of such a method. Specifically, after a downlink modulated wave modulated according to OFDM is demodulated, the demodulated signal is subjected to a Fourier transform, to thereby estimate the frequency characteristics of the propagation path.

By contrast, when digital modulation, such as Binary Phase Shift Keying (BPSK), Quadrature Phase Shift Keying (QPSK), and Quadrature Amplitude Modulation (QAM), is performed on the uplink, the uplink communication quality can be improved by compensating the characteristics of the uplink propagation path. This compensation is accomplished by superimposing time characteristics (delay profile) on a baseband filter of a digital modulator. The time characteristics are created by performing an inverse Fourier transform on the estimated frequency characteristics.

Meanwhile, the following technique is introduced into the radio communication system employing TDD. Specifically, the directivity of an antenna is controlled on the base station side by using a technique such as an adaptive array antenna. In general, when the radio communication system using TDD employs the adaptive array technique, the base station sets the directivity of the antenna to be optimum according to the characteristics of the uplink propagation path, and then transmits a downlink signal by using the directivity thus set.

To be more specific, the base station optimizes the directivity of the adaptive array antenna by using a known signal pattern (a preamble and an uplink pilot) included in an uplink TDD frame repeatedly transmitted in predetermined cycles. The base station transmits and receives user data by using a pattern (weight) of the optimized directivity.

Patent Document 1: Japanese Patent Application Publication No. 2002-141888

DISCLOSURE OF THE INVENTION

However, when the directivity of a downlink signal is optimized based on the characteristics of the uplink propagation path, a difference may occur between the characteristics of the downlink propagation path and the characteristics of the uplink propagation path used for a subsequent transmission. Accordingly, there arises a problem that a discrepancy is generated in the equalization parameters that compensate the characteristics of the uplink propagation path based on the characteristics of the downlink propagation path.

Specifically, there are the following problems: 1) in a case where an uplink signal is transmitted by applying a delay spread estimated based on a signal received through the uplink communication channel, the directivity of the adaptive array antenna cannot be properly optimized if the delay spread of the uplink signal is equalized in a section (training section) used for optimizing the directivity of the adaptive array antenna; and 2) the delay spread changes when the directivity is changed due to the optimization of the directivity of the adaptive array antenna and, therefore the effect of compensating the characteristics of the uplink propagation path cannot be obtained.

For this reason, it has been considered that, in the communication system employing TDD, there is no merit in equalization of the characteristics of the uplink propagation path in the mobile station (terminal) which transmits a signal on the uplink.

However, when the mobile station located, for example, in a building or elsewhere is to communicate with the base station placed outdoors, the speed of the directivity change is low because the mobile station does not move. On the other hand, under such a circumstance, delay waves of a relatively high level exist, causing a problem of a reduction in the communication speed, especially in the uplink communication channel.

An object of the present invention is to provide a radio communication method, a radio communication device, and a radio communication system, which are capable of preventing the reduction in the communication speed by preventing the discrepancy in the equalization parameters that compensate the propagation path characteristics.

To achieve the above objective, a first aspect of the present invention provides a radio communication method performed by a first radio communication device including an adaptive array antenna, and by a second radio communication device configured to perform radio communication with the first radio communication device. The method includes the steps of: monitoring, at the first radio communication device, change of a parameter for the adaptive array antenna, the parameter being used to control a directivity of a beam to be transmitted to the second radio communication device; suppressing, at the first radio communication device, control of the directivity, when a value indicating the change has fallen below a predetermined value in the step of monitoring; transmitting, from the first radio communication device to the second radio communication device, decrease information indicating that the value indicating the change has fallen below the predetermined value, when the value indicating the change has fallen below the predetermined value in the step of monitoring; judging, at the second radio communication device, a delay status of a reception signal received from the first radio communication device, when receiving the decrease information transmitted from the first radio communication device; equalizing, at the second radio communication device, a signal to be transmitted to the first radio communication device, based on the delay status of the reception signal; and transmitting the equalized signal from the second radio communication device to the first radio communication device.

A second aspect of the present invention according to the first aspect provides the radio communication method in which, in the step of equalizing, equalization is not performed on a signal which is included in signals to be transmitted to the first radio communication device, and which is used by the first radio communication device to control a directivity of the adaptive array antenna.

A third aspect of the present invention according to any one of the first and the second aspects provides the radio communication method including the steps of: transmitting, from the first radio communication device to the second radio communication device, increase information indicating that the value indicating the change has exceeded the predetermined value, when the value indicating the change has exceeded the predetermined value in the step of monitoring; and controlling, at the second radio communication device, equalization of a signal to be transmitted to the first radio communication device on the basis of the increase information.

A fourth aspect of the present invention provides a radio communication device including an adaptive array antenna, including: a monitor configured to monitor change of a parameter for the adaptive array antenna, the parameter being used to control a directivity of a beam to be transmitted; and a directivity controller configured to suppress control of the directivity, and to transmit decrease information indicating that a value indicating the change has fallen below a predetermined value, when the monitor detects that the value indicating the change has fallen below the predetermined value.

A fifth aspect of the present invention provides a radio communication device configured to perform radio communication with a base station including an adaptive array antenna, the radio communication device including: a judging unit configured to judge a delay status of a reception signal received from the base station, when receiving, from the base station, decrease information indicating that a value indicating change of a parameter for the adaptive array antenna has fallen below a predetermined value, the parameter being used to control a directivity of a beam to be transmitted; and an equalization controller configured to equalize a signal to be transmitted to the base station, and to transmit the equalized signal to the base station, on the basis of the delay status of the reception signal judged by the judging unit.

A sixth aspect of the present invention according to the fifth aspect provides the radio communication device in which the equalization controller transmits, to the base station, a signal used to control a directivity of the adaptive array antenna by the base station, without equalizing the signal.

A seventh aspect of the present invention according to any one of the fifth and the sixth aspects provides the radio communication device in which, the equalization controller controls equalization of a signal to be transmitted to the base station on the basis of increase information indicating that the value indicating the change has exceeded the predetermined value, when receiving the increase information from the base station.

An eighth aspect of the present invention provides a radio communication system including a first radio communication device including an adaptive array antenna, and a second radio communication device configured to perform radio communication with the first radio communication device. In the system, the first radio communication device comprises: a monitor configured to monitor change of a parameter for the adaptive array antenna, the parameter being used to control a directivity of a beam to be transmitted to the second radio communication device; and a directivity controller configured to suppress control of the directivity, and to transmit, to the second radio communication device, decrease information indicating that a value indicating the change has fallen below a predetermined value, when the monitor detects that the value indicating the change has fallen below the predetermined value, and the second radio communication device comprises: a judging unit configured to judge a delay status of a reception signal received from the first radio communication device, when receiving the decrease information from the first radio communication device; and an equalization controller configured to equalize a signal to be transmitted to the first radio communication device, and to transmit the equalized signal to the first radio communication device, on the basis of the delay status of the reception signal judged by the judging unit.

A ninth aspect of the present invention according to the eighth aspect provides the radio communication system in which the equalization controller transmits, to the base station, a signal used to control a directivity of the adaptive array antenna by the first radio communication device, without equalizing the signal. A tenth aspect of the present invention according to any one of the eighth and the ninth aspects provides the radio communication system in which: the directivity controller transmits, to the second radio communication device, increase information indicating that the value indicating the change has exceeded the predetermined value, when the value indicating the change has exceeded the predetermined value, and the equalization controller controls equalization of a signal to be transmitted to the first radio communication device on the basis of the increase information.

According to the present invention, the reduction in the communication speed can be prevented by preventing the gap in the equalization parameters that compensate the propagation path characteristics.

BEST MODE FOR CARRYING OUT THE INVENTION

Figure 1:
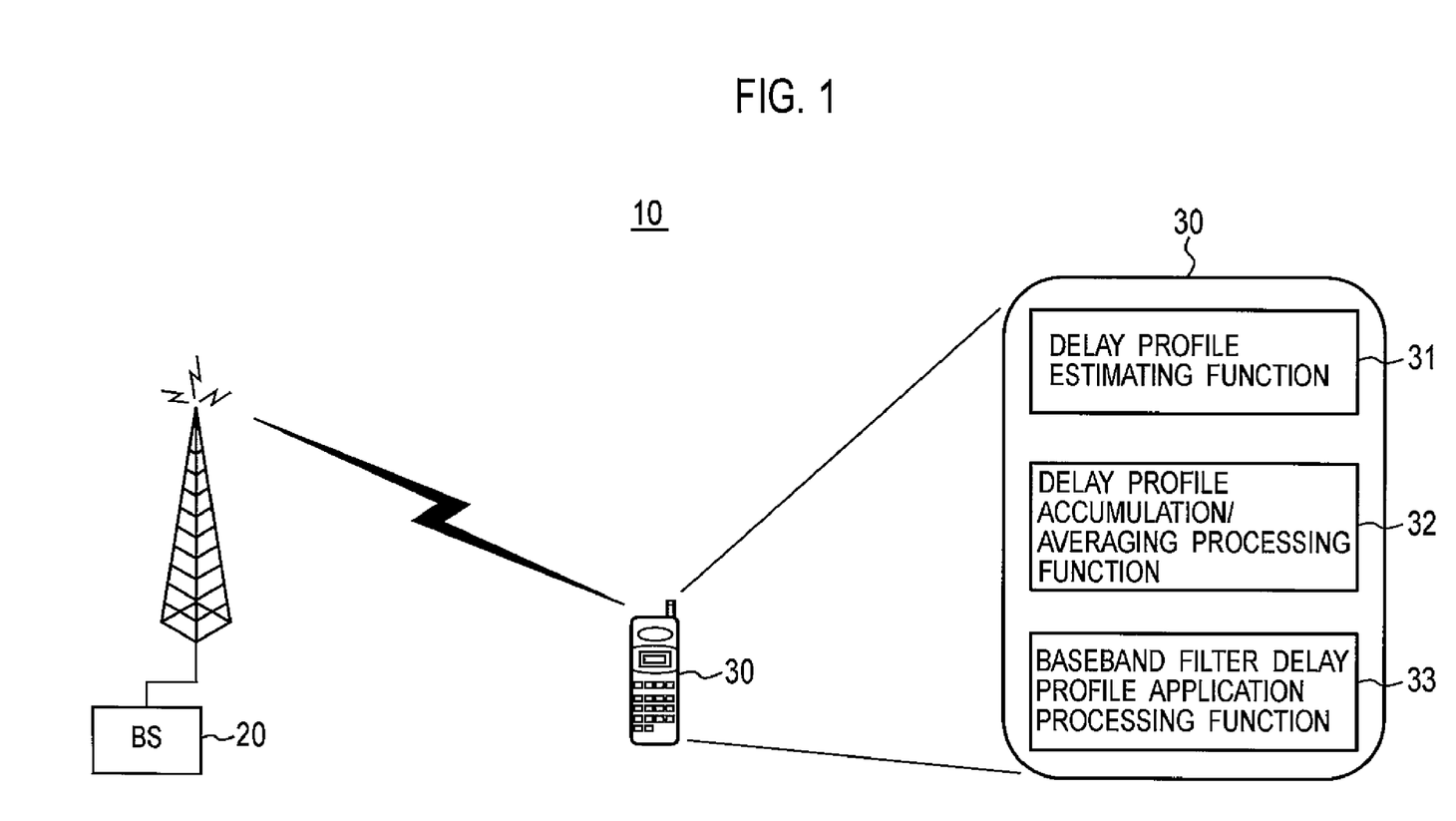
FIG. 1 is a schematic configuration diagram of a radio communication system according to an embodiment of the present invention.

An embodiment of the present invention will be given below with reference to the attached drawings. FIG. 1 is a schematic configuration diagram of a radio communication system according to the embodiment of the present invention. As shown in FIG. 1, a radio communication system 10 has a base station 20 as a first radio communication device, and a mobile terminal device (mobile station) 30, such as a mobile phone, as a second radio communication device.

In the present embodiment, a link from the base station 20 to the mobile terminal device 30 is a downlink, and a link from the mobile terminal device 30 to the base station 20 is an uplink.

In the radio communication system 10, OFDM is employed in the downlink, and BSPK, QPSK, 8PSK, or QAM is employed in the uplink.

Figure 2:
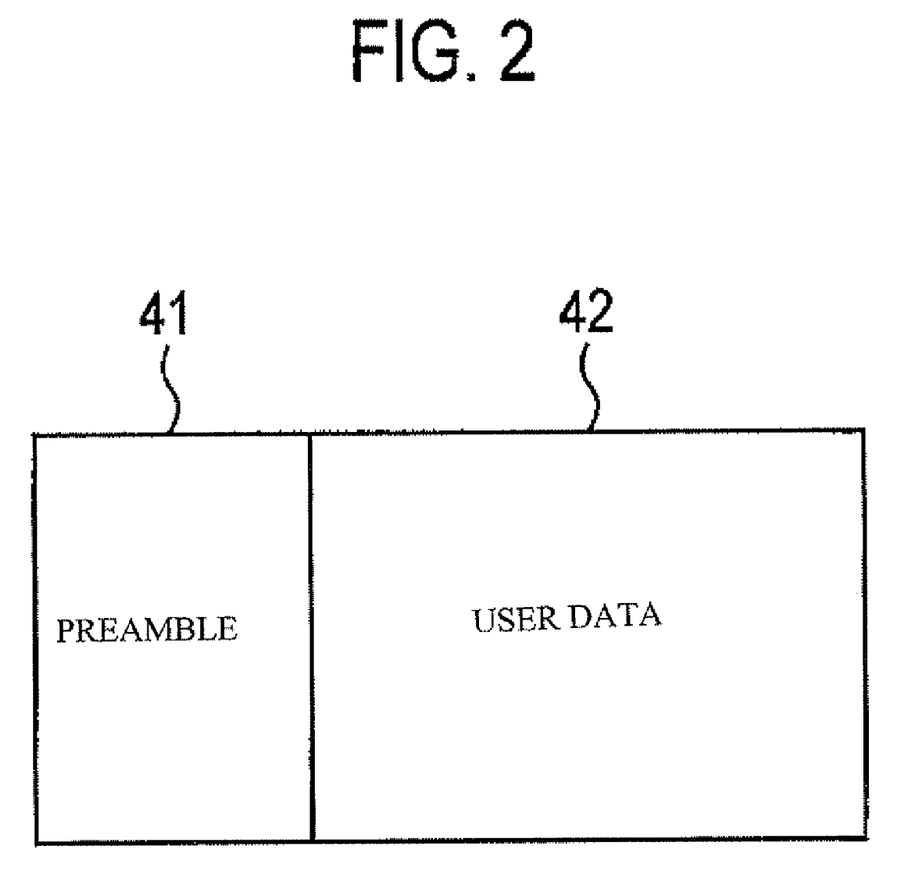
FIG. 2 is a configuration diagram of a transmission slot.

As shown in FIG. 2, a downlink (DL) slot used in the downlink and an uplink (UL) slot used in the uplink are each formed of a preamble 41 and user data 42 following the preamble 41.

The base station 20 has an adaptive array antenna, and monitors change of a parameter for the adaptive array antenna. Here, the parameter is used to control the directivity of a signal (beam) transmitted to the mobile terminal device 30.

When a value (change amount) indicating the change of the parameter has fallen below a predetermined value set in advance in monitoring the change, the base station 20 suppresses the directivity control of a signal transmitted to the mobile terminal device 30. Moreover, the base station 20 transmits, as flag information, decrease information indicating that the value indicating the change has fallen below the predetermined value, to the mobile terminal device 30. When, on the other hand, the value indicating the change of the parameter has exceeded the predetermined value, the base station 20 transmits increase information indicating the exceeding as flag information, to the mobile terminal device 30.

Figure 3:
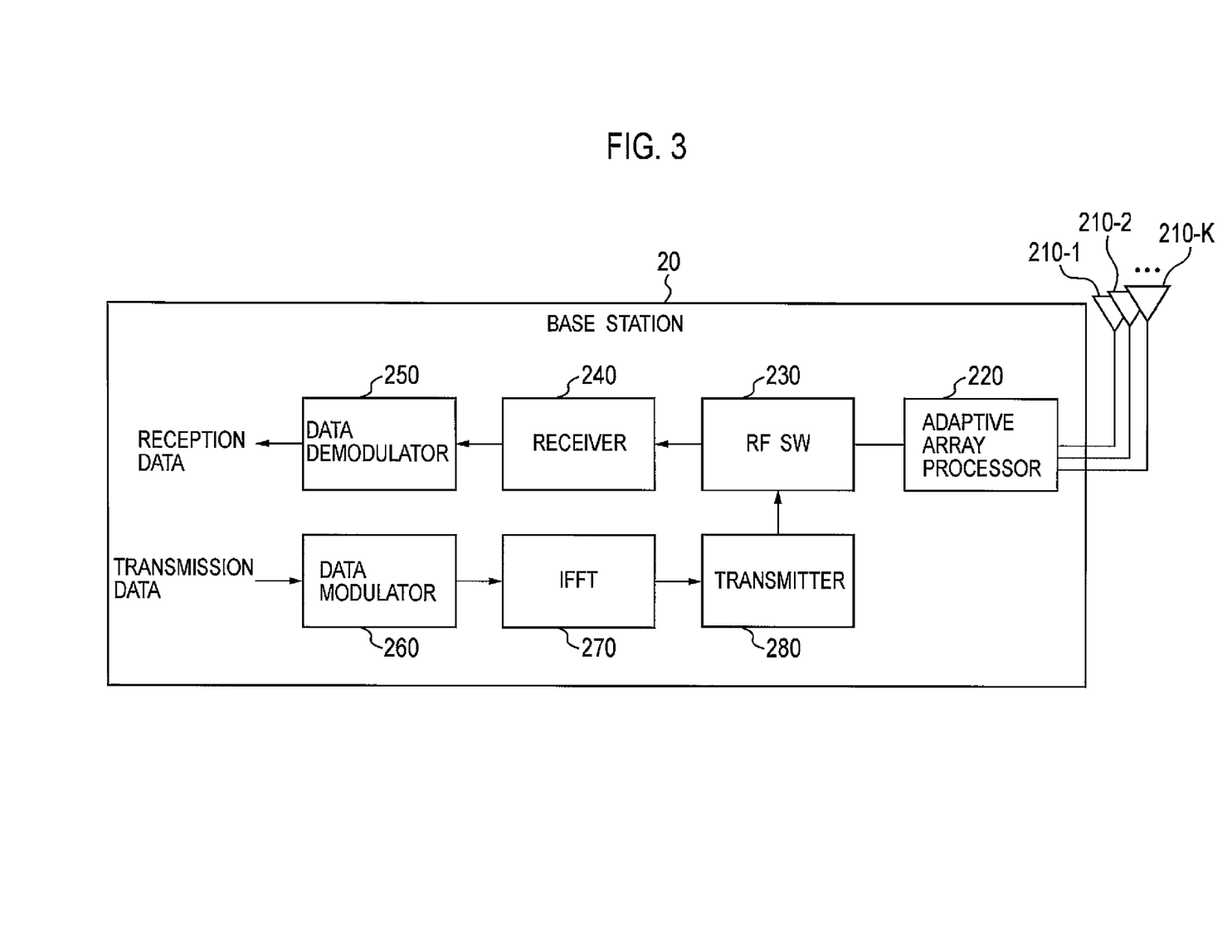
FIG. 3 is a block diagram of a first radio communication device (base station) according to the embodiment.

FIG. 3 is a block diagram of the base station 20. In the present embodiment, the base station 20 constitutes the first radio communication device.

The base station 20 includes an adaptive array antenna (abbreviated as AA below). As shown in FIG. 3, the base station 20 has: multiple antennas 210-1 to 210-K (K pieces of antennas in the present embodiment); an adaptive array processor 220; an RF switch 230 including an antenna switches (duplexer) and the like; a receiver 240 that performs channel estimation and channel equalization processing and the like on a signal received by each antenna; a data demodulator 250 that performs demodulation processing on a signal received from the receiver 240 to acquire reception data; a data modulator 260 that modulates transmission data according to OFDM; an inverse Fourier transformer (IFFT) 270 that performs inverse Fourier transform processing on the modulated data; and a transmitter 280 that converts a signal subjected to the inverse Fourier transform into a transmission format.

The adaptive array processor 220 monitors the change amount of the AA directivity parameter. When the change of the AA parameter, specifically, of the AA directivity parameter is equal to or less than a certain amount over several slots, the adaptive array processor 220 suppresses the AA control, and also sets a specific flag (AA control suppression flag) in a downlink communication slot to "1" to generate decrease information indicating that the control has been suppressed. In the present embodiment, the adaptive array processor 220 constitutes a monitor and a directivity controller.

Moreover, the adaptive array processor 220 determines the AA directivity parameter based on an AA training signal received through the uplink communication channel. When characteristics of the uplink communication channel, that is, of the uplink propagation path are equalized, the adaptive array processor 220 does not control the directivity of a downlink signal from an uplink reception slot used for the training, but controls the directivity from a next downlink transmission slot.

When the change amount of the estimated AA directivity parameter is changed significantly, the adaptive array processor 220 indicates so by using a flag in the downlink communication slot.

The mobile terminal device 30 receives, from the base station 20, the flag information (decrease information) indicating that the value indicating the change of the AA directivity parameter has fallen below the predetermined value, the parameter being used to control the directivity of a transmission signal (beam).

Upon receipt of the above flag information from the base station 20, the mobile terminal device 30 judges the delay status of a reception signal received from the base station 20. The mobile terminal device 30 equalizes a signal to be transmitted to the base station 20 on the basis of the judged delay status of the reception signal, and then transmits the equalized signal to the base station 20. Note here that the mobile terminal device 30 transmits the training signal, used by the base station 20 to control the AA directivity, without equalizing the training signal.

Upon receipt from the base station 20 of flag information (increase information) indicating that the value indicating the change of the AA directivity parameter has exceeded the predetermined value, the mobile terminal device 30 controls the equalization processing on a signal to be transmitted to the base station 20 on the basis of the increase information. Specifically, the mobile terminal device 30 includes a function to estimate the characteristics of a propagation path on the downlink from the base station 20. Based on the estimation result of the propagation path characteristics, the mobile terminal device 30 changes a tap coefficient for a baseband filter, which is applied to the uplink communication channel.

To be more specific, as shown in FIG. 1, the mobile terminal device 30 has the following as functions for optimizing the baseband filter: a delay profile estimating function 31, a delay profile accumulation/averaging processing function 32, and a baseband filter delay profile application processing function 33.

Figure 4:
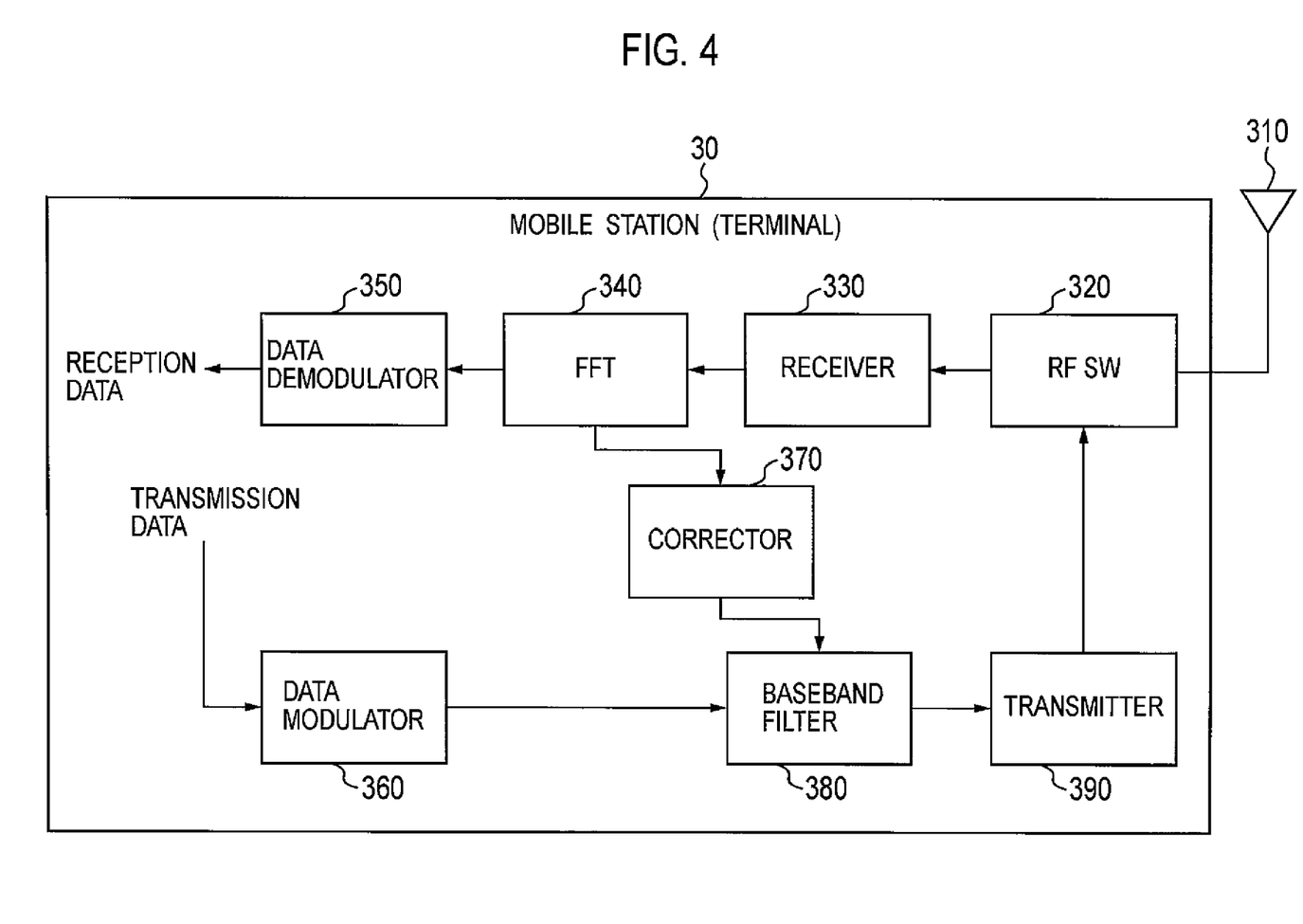
FIG. 4 is a block diagram of a second radio communication device (mobile terminal device) according to the embodiment.

FIG. 4 is a block diagram of the mobile terminal device 30. In the present invention, the mobile terminal device 30 constitutes the second radio communication device.

The mobile terminal device 30 has: a transmit and receive antenna 310, an RF switch 320 including an antenna switcher (duplexer) and the like; a receiver 330 that performs channel estimation and channel equalization processing on a signal received by each antenna; a fast Fourier transformer 340 that performs a fast Fourier transform (FFT) on a signal received from the receiver 330; a data demodulator 350 that performs demodulation to acquire reception data; a data modulator 360 that modulates transmission data according to a predetermined modulation scheme such as BPSK; an corrector 370 that compensates the propagation path characteristics based on the data subjected to the FFT processing, and corrects a tap coefficient for the baseband filter; a baseband filter 380 that performs filtering processing on the modulated data according to the tap coefficient corrected by the corrector 370; and a transmitter 390 that converts the signal subjected to the filtering processing into a transmission format, and performs transmission by using the uplink communication channel for which the estimated delay profile is equalized.

In the present embodiment, the corrector 370 constitutes a judging unit. Moreover, in the present embodiment, an equalization controller is configured by the corrector 370, baseband filter 380, and transmitter 390.

Upon receipt of the flag information from the base station 20, the mobile terminal device 30 starts estimating the delay profile (propagation path) of the downlink communication channel. Then, the mobile terminal device 30 transmits a signal by using the propagation path of which characteristics have been equalized based on the estimated delay profile, specifically, by using the uplink communication.

Among the signals transmitted through the uplink communication channel, a signal used for the AA training is transmitted without being equalized by the transmitter 390.

When the change amount of the estimated AA directivity parameter has been changed significantly, and when the flag in the downlink communication slot indicates the significant change of the change amount, the mobile terminal device 30 does not equalize the uplink communication channel by using a following communication frame, but controls the directivity by applying the AA directivity parameter to each slot.

In the present embodiment, since OFDM is employed for the downlink communication channel, the Fourier transform is performed before every demodulation. Namely, the characteristics of the propagation path are always estimated in the downlink communication channel. When the characteristics of the propagation path are estimated in the downlink communication channel, the mobile terminal device 30 adds a parameter that has characteristics uplink to the estimated characteristics of the propagation path, to the baseband filter on the transmission side, and compensates the characteristics of the uplink propagation path by using an equalizer on the transmission side. Thereby, modulation accuracy can be maintained even when an advanced modulation scheme is employed.

Figure 5:
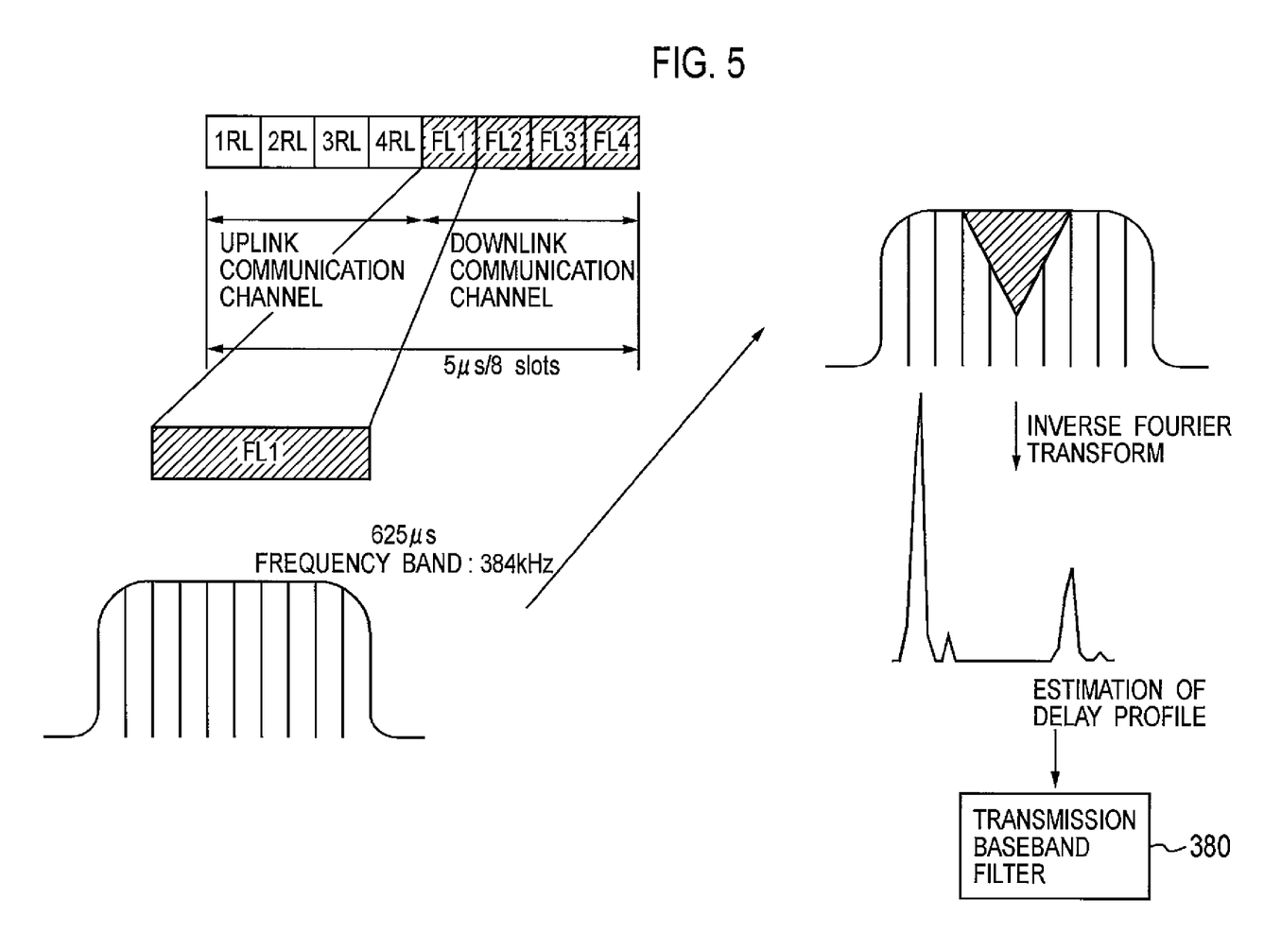
FIG. 5 is an explanatory diagram explaining processing of compensating characteristics of an uplink propagation path by applying OFDM to a downlink slot.

FIG. 5 is an explanatory diagram explaining processing of compensating the characteristics of the uplink propagation path by applying OFDM to a downlink slot. Here, the slot configuration is similar to that in Personal Handyphone System (PHS) (8 slots/5 ms).

As shown in FIG. 5, as is similar to PHS, the frequency band is set to 384 kHz, and one slot is set to 625 μs. One frame is made up of a total of 8 slots, 4 slots for each of the uplink and the downlink. Here, an OFDM tone is set every 2 kHz. Out of the 192 tones (384 kHz/2 kHz, 12 tones are used as a guard tone or a pilot tone.

Therefore, 180 tones are set for each slot. When one tone is modulated by using QPSK or 16QAM, 360 bits or 720 bits can be transmitted in each slot. In short, the data rate is 36 kbps (720*200/4).

Upon receipt of a downlink slot, the mobile terminal device 30 performs a Fourier transform on the reception signal to demodulate it into OFDM tones. Based on the level of each OFDM tone, the mobile terminal device 30 estimates the frequency characteristics of the propagation path. After estimating the frequency characteristics of the propagation path, the mobile terminal device 30 performs an inverse Fourier transform on the frequency characteristics, to thereby estimate a delay profile of the propagation path. Then, the mobile terminal device 30 compensates characteristics of the uplink propagation path by convolving uplink characteristics of the delay profile, with the baseband filter 380.

In TDD, the above mentioned control is possible on the basis of the assumptions that the same frequency band is used for the uplink and the downlink, and that the uplink and the downlink have almost the same propagation path characteristics if the interval between an uplink slot and a downlink slot is short.

Figure 6:
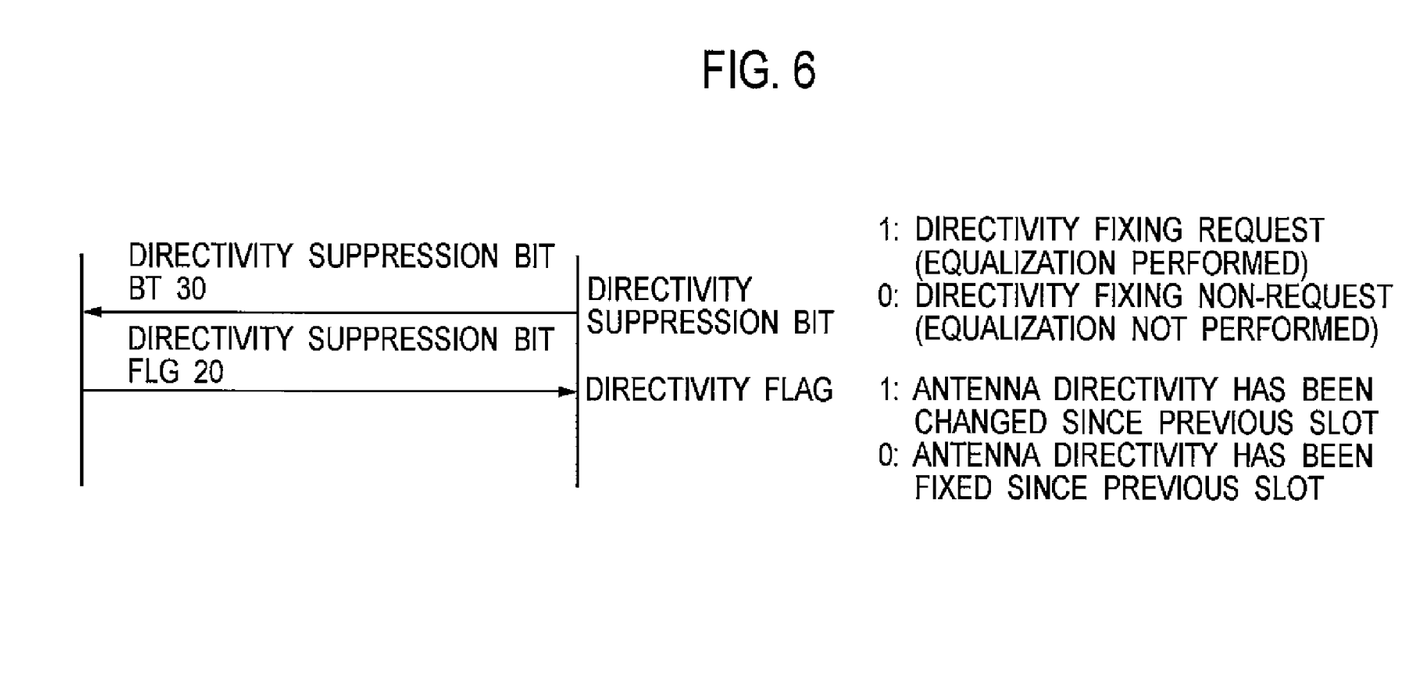
FIG. 6 is an explanatory diagram of directivity suppression bit information and directivity flag information.

Moreover, in the present embodiment, the mobile terminal device 30 transmits directivity suppression bit information BT 30 to the base station 20, as shown in FIG. 6.

When set to "1", the directivity suppression bit information BT 30 means a "directivity fixing request (equalization performed)" which is a request to fix the directivity because the channel equalization processing has been performed. When set to "0," on the other hand, the directivity suppression bit information BT 30 means a "directivity fixing non-request (equalization not performed)" which indicates that the channel equalization is not performed and therefore the directivity is not fixed.

The base station 20 transmits directivity flag information FLG 20 to the mobile terminal device 30.

When set to "1," the directivity flag information FLG 20 means that "the antenna directivity has been changed since the previous slot." When set to "0," on the other hand, the directivity flag information FLG 20 means that "the antenna directivity has been fixed since the previous slot."

Figure 7:
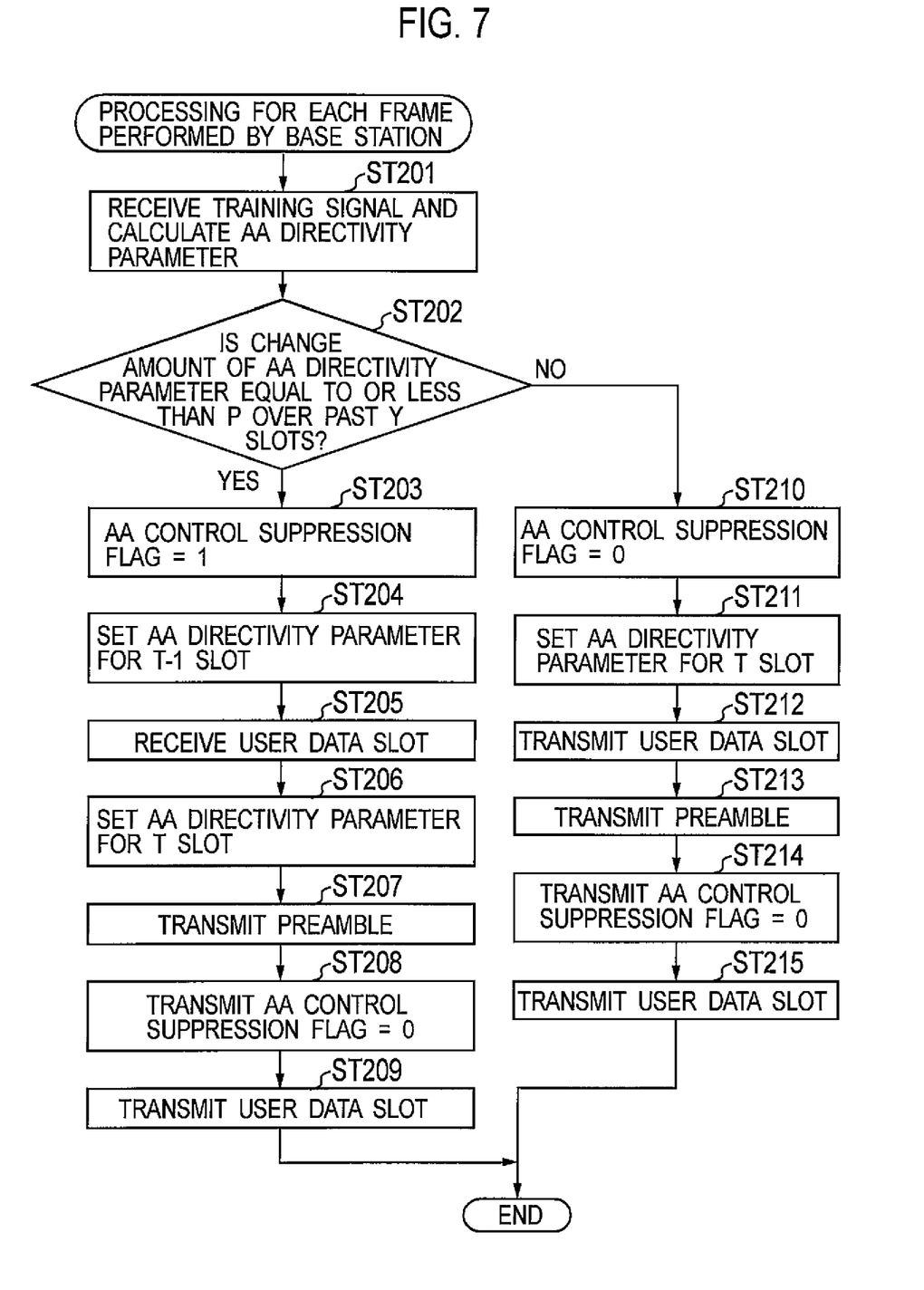
FIG. 7 is a flowchart showing processing for each frame performed by the base station according to the embodiment.
Figure 8:
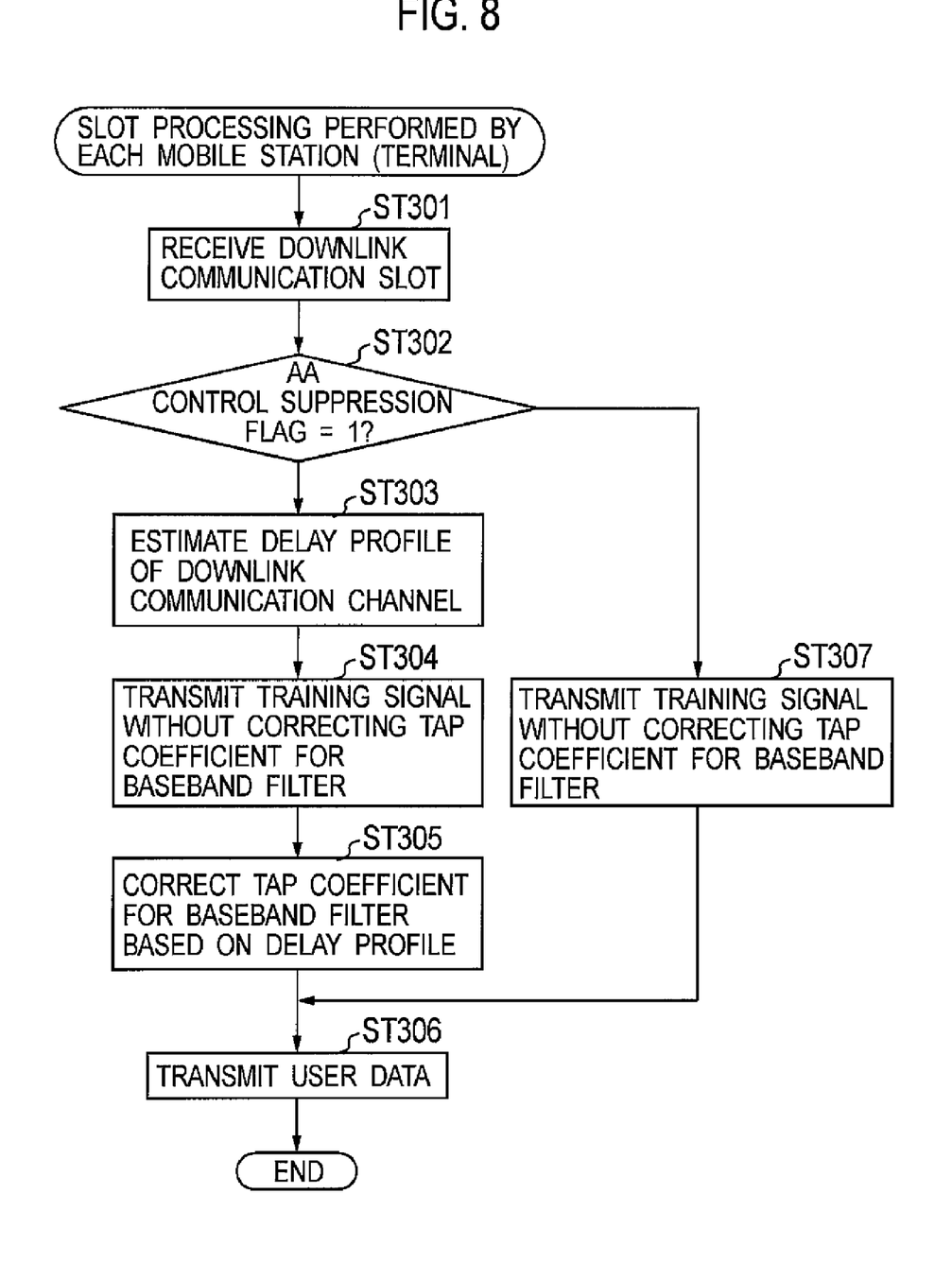
FIG. 8 is a flowchart showing slot processing performed by each mobile terminal device according to the embodiment.

Next, descriptions will be given of processing for each frame performed by the base station 20, and of slot processing performed by each mobile terminal device 30.

FIG. 7 is a flowchart showing processing for each frame performed by the base station 20 in step ST201. Firstly, the base station 20 receives a training signal, and calculates an AA directivity parameter.

In step ST202, the base station 20 judges whether or not a change amount of the AA directivity parameter is equal to or less than p over the past y slots.

Upon judging that the change amount of the AA directivity parameter is equal to or less than p over the past y slots (i.e., that the change amount has fallen below the predetermined value p), the base station 20 sets an AA control suppression flag to "1" in step ST203, and suppresses AA control.

In ST204, the base station 20 sets an AA directivity parameter for a T-1 slot (slot used for the preceding transmission slot).

In ST205, the base station 20 receives a user data slot. In step ST206, the base station 20 sets the AA directivity parameter for the T slot.

In ST207, the base station 20 transmits a preamble. In step ST208, the base station 20 transmits the AA control suppression flag set to "0." In step ST209, the base station 20 transmits a user data slot.

On the other hand, upon judging that the change amount of the AA directivity parameter is not equal to or less than p (i.e., that the change amount has exceeded the predetermined value p) over the past y slots, the base station 20 sets the AA control suppression flag to "0" in step ST210, and does not suppress the AA control.

In ST211, the base station 20 sets the AA directivity parameter for the T slot. In step ST212, the base station 20 receives a user data slot.

In ST213, the base station 20 transmits a preamble. In step ST214, the base station 20 transmits the AA control suppression flag set to "0." In step ST215, the base station 20 transmits a user data slot.

FIG. 8 is a flowchart showing the slot processing performed by each mobile terminal device 30. Firstly, in ST301, the mobile terminal device 30 receives a downlink slot.

In step ST302, the mobile terminal device 30 judges whether or not the AA control suppression flag is set to "1."

Upon judging that the AA control suppression flag is set to "1," the mobile terminal device 30 estimates a delay profile of the downlink communication channel in ST303.

In ST304, the mobile terminal device 30 transmits a training signal without correcting a tap coefficient for the baseband filter 380.

In ST305, the mobile terminal device 30 corrects the tap coefficient for the baseband filter 380 based on the delay profile. In step ST306, the mobile terminal device 30 transmits user data.

On the other hand, when judging that the AA control suppression flag is not "1," the mobile terminal device 30 transmits a training signal without correcting a tap coefficient for the baseband filter 380 in step ST307.

Next, a description will be given, associated with FIG. 9, of transmit and receive operations performed by the base station and the mobile terminal device in the radio communication system according to the present embodiment.

Figure 9:
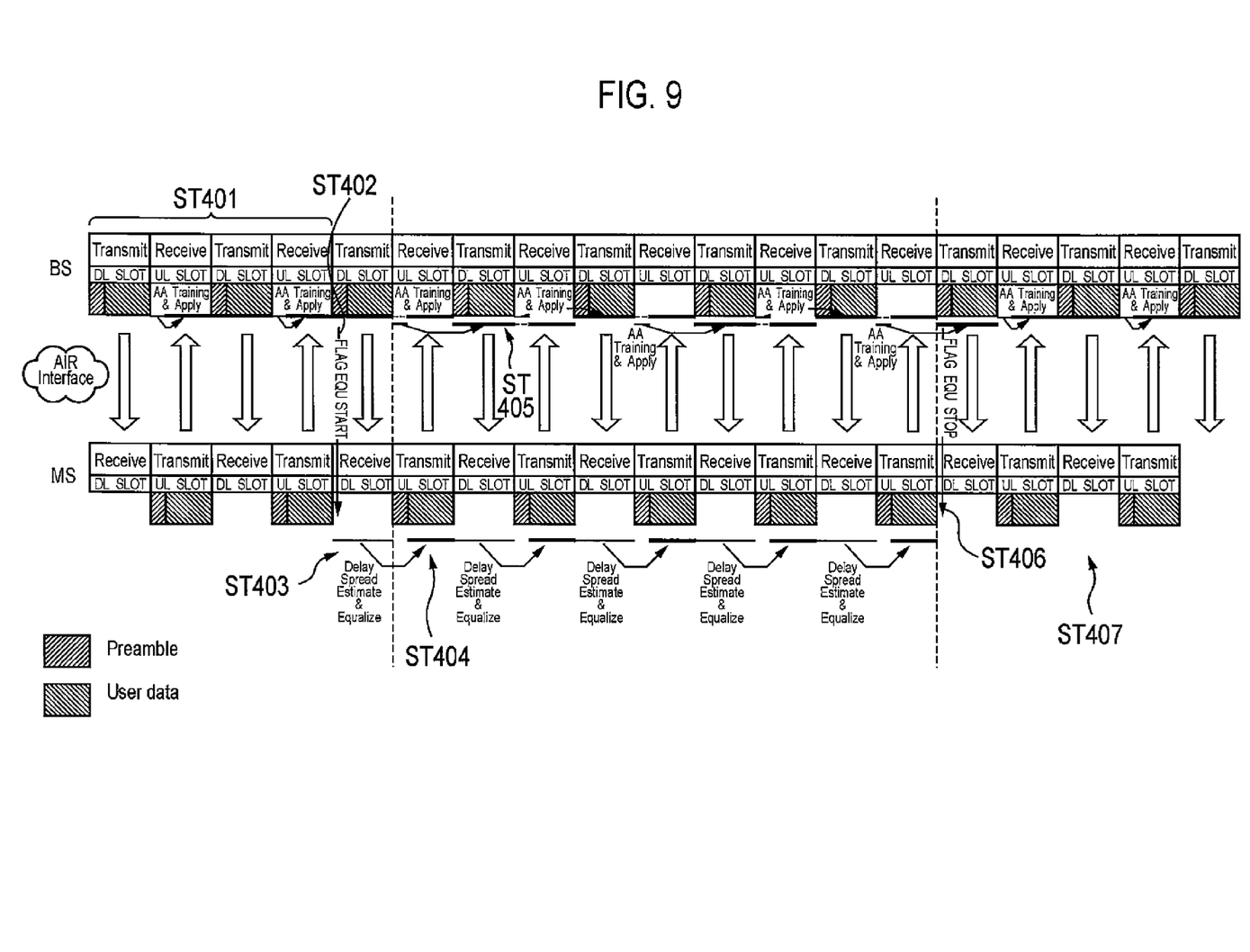
FIG. 9 is an explanatory diagram of transmit and receive operations performed by the base station and the mobile terminal device according to the embodiment.

In FIG. 9, DL represents a downlink, and UL represents an uplink. In addition, BS represents the base station, and MS represents the mobile terminal device (mobile station).

The base station monitors a change amount of an AA directivity parameter for a certain period of time (ST401).

When the change of the AA directivity parameter is equal to or less than a certain amount over several slots, the base station suppresses AA control, and indicates the suppression of the AA control by using a flag in a downlink communication slot (ST402).

Meanwhile, upon detection of the flag set in step ST402, the mobile terminal device starts estimating a delay profile of the downlink communication channel (ST403).

The mobile terminal device equalizes propagation path characteristics by using the estimated delay profile, and transmits a signal through the uplink communication channel (ST404).

Here, among the signals transmitted through the uplink communication channel, a signal used for the AA training is transmitted without being equalized by the mobile terminal device.

The base station receives the AA training signal on the uplink communication channel and thereby determines the AA directivity parameter. Here, when the uplink communication channel is equalized, the mobile terminal device starts applying the AA directivity control not from the reception slot used for the training, but from the next downlink transmission slot (ST405).

When the estimated AA directivity parameter has changed significantly, the base station indicates so by using a flag in the downlink communication slot (ST406). Thereafter, the base station does not equalize the uplink communication channel for each frame, but applies the AA directivity parameter to each slot to control the directivity (ST407).

As described above, according to the present embodiment, the base station 20 includes a monitor and a directivity controller. The monitor monitors change of a parameter (AA directivity parameter) for an adaptive array antenna, the parameter being used to control the directivity of a signal (beam) transmitted to the mobile terminal device 30. When a value (change amount) indicating the change of the parameter has fallen below a predetermined value set in advance, the directivity controller suppresses directivity control, and also transmits decrease information indicating the falling, as flag information, to the mobile terminal device 30. When the value indicating the change has exceeded the predetermined value, the directivity controller transmits increase information indicating the exceeding, as flag information, to the mobile terminal device 30.

The mobile terminal device 30 includes a judging unit and an equalization controller. The judging unit judges a delay status of a reception signal when receiving the flag information (decrease information) from the base station 20. The equalization controller equalizes a signal to be transmitted to the base station 20 on the basis of the delay status of the reception signal judged by the judging unit, and then transmits the equalized signal to the base station 20.

Thereby, reduction in the communication speed can be prevented by preventing the discrepancy in the equalization parameters that compensate the propagation path characteristics. Even when the mobile station located in a building or elsewhere communicates with the base station placed outdoors, the reduction in the communication speed, particularly in the uplink communication channel, can be prevented. Note that the entire content of Japanese Patent Application Publication No. 2006-124507 (filed on Apr. 27, 2006) is incorporated in the description of the present application by reference.

Industrial Applicability

As described above, with the radio communication method, the radio communication device and the radio communication system according to the present invention, the reduction in the communication speed can be prevented by preventing the discrepancy in the equalization parameters that compensate the propagation path characteristics. Accordingly, the present invention is useful in radio communication such as mobile communication.

The invention claimed is:

1. A radio communication method performed by a first radio communication device including an adaptive array antenna, and by a second radio communication device configured to perform radio communication with the first radio communication device, the method comprising the steps of:

monitoring, at the first radio communication device, change of a parameter for the adaptive array antenna, the parameter being used to control a directivity of a beam to be transmitted to the second radio communication device;

suppressing, at the first radio communication device, control of the directivity, when a value indicating the change has fallen below a predetermined value in the step of monitoring;

transmitting, from the first radio communication device to the second radio communication device, decrease information indicating that the value indicating the change has fallen below the predetermined value, when the value indicating the change has fallen below the predetermined value in the step of monitoring;

judging, at the second radio communication device, a delay status of a reception signal received from the first radio communication device, when receiving the decrease information transmitted from the first radio communication device;

equalizing, at the second radio communication device, a signal to be transmitted to the first radio communication device, based on the delay status of the reception signal; and transmitting the equalized signal from the second radio communication device to the first radio communication device.

2. The radio communication method according to claim 1, wherein in the step of equalizing, equalization is not performed on a signal which is included in signals to be transmitted to the first radio communication device, and which is used by the first radio communication device to control a directivity of the adaptive array antenna.

3. The radio communication method according to any one of claim 1 or 2, further comprising the steps of:

transmitting, from the first radio communication device to the second radio communication device, increase information indicating that the value indicating the change has exceeded the predetermined value, when the value indicating the change has exceeded the predetermined value in the step of monitoring; and controlling, at the second radio communication device, equalization of a signal to be transmitted to the first radio communication device on the basis of the increase information.

4. A radio communication system including a first radio communication device including an adaptive array antenna, and a second radio, communication device configured to perform radio communication with the first radio communication device, wherein the first radio communication device comprises:

a monitor configured to monitor change of a parameter for the adaptive array antenna, the parameter being used to control a directivity of a beam to be transmitted to the second radio communication device; and a directivity controller configured to suppress control of the directivity, and to transmit, to the second radio communication device, decrease information indicating that a value indicating the change has fallen below a predetermined value, when the monitor detects that the value indicating the change has fallen to below the predetermined value, and the second radio communication device comprises:

a judging unit configured to judge a delay status of a reception signal received from the first radio communication device, when receiving the decrease information from the first radio communication device; and an equalization controller configured to equalize a signal to be transmitted to the first radio communication device, and to transmit the equalized signal to the first radio communication device, on the basis of the delay status of the reception signal judged by the judging unit.

5. The radio communication system according to claim 4, wherein the equalization controller transmits, to first radio communication device, a signal used to control a directivity of the adaptive array antenna by the first radio communication device, without equalizing the signal.

6. The radio communication system according to any one of claim 4 and or 5, wherein the directivity controller transmits, to the second radio communication device, increase information indicating that the value indicating the change has exceeded the predetermined value, when the value indicating the change has exceeded the predetermined value, and the equalization controller controls equalization of a signal to be transmitted to the first radio communication device on the basis of the increase information.

* * * * *